US012453506B2

(12) United States Patent
Phillips et al.

(10) Patent No.: US 12,453,506 B2
(45) Date of Patent: Oct. 28, 2025

(54) PORTABLE WEARABLE EYE MOVEMENT MONITORING SYSTEM, DEVICE AND MONITORING METHOD

(71) Applicant: UEA ENTERPRISES LTD, Norwich (GB)

(72) Inventors: John Phillips, Norwich (GB); Stephen Cox, Norwich (GB); Jacob Newman, Norwich (GB); Matthew Wright, Norwich (GB); Justin Pisani, Norwich (GB)

(73) Assignee: UEA ENTERPRISES LTD, Norwich (GB)

( * ) Notice: Subject to any disclaimer, the term of this patent is extended or adjusted under 35 U.S.C. 154(b) by 993 days.

(21) Appl. No.: 17/058,754

(22) PCT Filed: May 24, 2019

(86) PCT No.: PCT/GB2019/051440
§ 371 (c)(1),
(2) Date: Nov. 25, 2020

(87) PCT Pub. No.: WO2019/224557
PCT Pub. Date: Nov. 28, 2019

(65) Prior Publication Data
US 2021/0204861 A1    Jul. 8, 2021

(30) Foreign Application Priority Data
May 25, 2018  (GB) ..................................... 1808649

(51) Int. Cl.
*A61B 5/398*  (2021.01)
*A61B 3/113*  (2006.01)
*A61B 5/00*  (2006.01)

(52) U.S. Cl.
CPC .............. *A61B 5/398* (2021.01); *A61B 3/113* (2013.01); *A61B 5/4863* (2013.01);
(Continued)

(58) Field of Classification Search
CPC ....... A61B 5/398; A61B 3/113; A61B 5/4863; A61B 5/6803; A61B 5/6814; A61B 2560/0214
See application file for complete search history.

(56) References Cited

U.S. PATENT DOCUMENTS 6,032,065 A    2/2000 Brown
2002/0188216 A1*  12/2002  Kayyali .............. A61B 5/6814
600/544

(Continued)

FOREIGN PATENT DOCUMENTS

DE    202008002129 U1    7/2008

OTHER PUBLICATIONS

International Search Report and Written Opinion for PCT/GB2019/051440 mailed Jan. 27, 2020.

*Primary Examiner* — Adam Z Minchella
(74) *Attorney, Agent, or Firm* — Thomas Horstemeyer, LLP (57) ABSTRACT

A portable wearable eye movement monitoring system, device and method are disclosed. The system comprises a sensor electrode array (22a, 22b) configured to be attached substantially about each of a plurality predetermined positions on a user's face, a logging unit 30 and a battery power source. The sensor electrode array (22a, 22b), when worn, is positioned laterally about the user's head with respect to the user's eyes whereby the portable wearable eye movement monitoring system is substantially outside the user's field of vision. The sensor electrode array (22a, 22b) is configured to obtain data on eye movements of the subject. The logging (Continued)

unit (30) is configured to communicate with the sensor electrode array (22*a*, 22*b*) to receive the obtained data and record the data in a data store, the battery power source being configured to power the wearable monitoring system for a plurality of days whereby data on eye movements of the subject is captured substantially continuously for said plurality of days.

16 Claims, 6 Drawing Sheets

(52) U.S. Cl.
CPC .......... *A61B 5/6803* (2013.01); *A61B 5/6814* (2013.01); *A61B 2560/0214* (2013.01)

(56) References Cited

U.S. PATENT DOCUMENTS

| | | | |
|---|---|---|---|
| 2010/0217100 A1* | 8/2010 | LeBoeuf | A61B 5/6826 600/382 |
| 2015/0105678 A1* | 4/2015 | Takei | A61B 5/7285 600/300 |
| 2015/0148619 A1* | 5/2015 | Berg | A61B 5/6804 600/300 |
| 2017/0041699 A1* | 2/2017 | Mackellar | A61B 5/316 |
| 2017/0340232 A1* | 11/2017 | Stewart | A61B 5/291 |
| 2018/0049663 A1* | 2/2018 | Suh | A61B 5/05 |
| 2019/0117062 A1* | 4/2019 | Yeo | A61B 5/4836 |

\* cited by examiner

PORTABLE WEARABLE EYE MOVEMENT MONITORING SYSTEM, DEVICE AND MONITORING METHOD

CROSS-REFERENCE TO RELATED APPLICATIONS

This application is a 35 U.S.C. § 371 National Stage Patent Application of, and claims priority to, Patent Cooperation Treaty Application number PCT/GB2019/051440, filed on 24 May 2019, and entitled "PORTABLE WEARABLE EYE MOVEMENT MONITORING SYSTEM, DEVICE AND MONITORING METHOD," which claims priority to and the benefit of Great Britain Patent Application number 1808649.6 filed on 25 May 2018, where both of these applications are incorporated herein by reference in their entirety.

FIELD OF THE INVENTION

The present invention relates to a wearable eye movement monitoring system, device and monitoring method that are particularly applicable for long-term wear by and monitoring of a subject.

BACKGROUND TO THE INVENTION

There are a number of situations where long term monitoring of a subject is desirable.

For example, when attempting to diagnose causes of dizziness spells it is desirable to understand circumstances during which dizziness episodes arise. Dizziness is usually episodic and short-lived, so when a patient presents to their health care provider, examination is often normal.

Dizziness is a common condition that is responsible for a significant degree of material morbidity and burden on health services. There are multiple causes of dizziness, and these originate from pathologies affecting a large variety of different organ systems. As such, diagnosis is challenging and patients often experience significant delay in receiving a diagnosis.

In England and Wales, eight out of every 1,000 patients are likely to consult with their General Practitioner complaining of dizziness every year. Symptoms of dizziness or imbalance are experienced by 30% of the population by the age of 65 years. One in four in the community have 'significant' dizziness at any given time. Dizziness is the most common reason for a physician to visit a patient of over 75 years-old. 'Dizzy patients' present via a variety of routes: A&E, general practitioners, ENT, cardiology and neurology. The mean number of physicians a patient visits before receiving a correct diagnosis is 4.5.

There are many traditional and contemporary balance tests available (caloric testing, dynamic posturography, rotatory chair testing, cVEMP testing, OVEMP testing, vHIT, etc.), but they provide only a snapshot of vestibular function when performed in the absence of an actual 'dizzy attack'. Also, owing to their size and cost, they can only be used in specialist hospital departments.

The common causes of vestibular dysfunction occur momentarily, and by the time a patient presents to a specialist, they are usually asymptomatic. Two conditions which attract considerable attention in the clinical and research communities are Ménière's disease and Vestibular Migraine. The causes of these conditions are not fully understood and their assessment is challenging. Both of these conditions may result in dizziness lasting for many hours, but because patients may be asymptomatic for days, weeks or even months between attacks, it is often the case that there are few findings to be identified when the patient is assessed. Ménière's disease and Vestibular Migraine are provided as examples, but these conditions are not unique in their mode of presentation, as the majority of balance disorders present in this manner.

STATEMENT OF INVENTION

According to an aspect of the present invention, there is provided a portable wearable eye movement monitoring system comprising a sensor electrode array configured to be attached substantially about each of a plurality of predetermined positions on a user's face, a logging unit and a battery power source, the sensor electrode array, the sensor electrode array being configured to obtain data on eye movements of the subject, the logging unit being configured to communicate with the sensor electrode array to receive the obtained data and record the data in a data store, the battery power source being configured to power the wearable monitoring system for a plurality of days whereby data on eye movements of the subject is captured substantially continuously for said plurality of days.

The sensor electrode array may comprise a plurality of electrodes mounted in a mount for positioning the electrodes at or about predetermined positions on a subject's head when the mount is worn.

Preferably, the electrodes of the sensor electrode array are divided between two mounts, the mounts positioning their respective electrodes on opposite sides of the subject's head when worn.

Preferably, the logging unit comprises an ear-piece.

The mount or mounts preferably include a data connector to connect to a connection port on the logging unit.

Preferably, the logging unit includes an orientation sensor.

The system may further include an event marker button configured to cause the logging unit to tag the time and date that the event market button is pressed in the data store.

Preferably, the sensor electrode array is configured to obtain data on the corneo-retinal potential of the subject.

According to another aspect of the present invention, there is provided a computer-implemented method of identifying instances of dizziness experienced by a user comprising: receiving time series data on the user's corneo-retinal potential recorded by a portable wearable eye movement monitoring system while worn by the user over one or more days;
processing the time series data in a computer system including:
  applying a sliding window to the time series data;
  for each window, searching for predetermined recognition features; and,
  for an identified recognition feature, outputting data from, or derived from, the time series corresponding to the window for classifying a dizziness instance.

Embodiments of the present invention include a wearable device that is suitable for long term use (periods of hours or days) that monitors and records data on eye movements. There is an intimate relationship between eye movements and the organs in the inner ear, which can be explored to reveal the underlying cause of a patient's dizziness. Abnormal eye movements (nystagmus) are the consequence of a malfunction in the pathway that involves the eyes, brain and inner ears. Nystagmus is present during the causes of dizziness that affect this pathway.

In preferred embodiments of the present invention, the corneo-retinal potential (CRP) produced by the eyes as they move is recorded. When interpreted by an expert, these CRP signals provide information regarding the characteristics of eye movement, which can include nystagmus.

Although there are no particular limits to duration of which the system may be worn or the monitoring period, embodiments of the present invention would typically be worn for around 23-hours a day, for a period of up to 30-days. Subjects will be expected to wear the device during their normal everyday activities. At the end of a monitoring period, the data captured provides substantial valuable information that can be automatically and/or manually interpreted. This process will be termed vestibular telemetry.

Preferred embodiments use a sensor electrode array that attaches to the skin and an electronic system that records the CRP signal. This is designed to be portable, worn for extended periods and to overcome the technical challenges of long term data capture. These design objectives have guided the ergonomics (size, weight and usability) of the device, the internal electronics, as well as the composition of the skin-contacting materials. The face-adhering electrodes used within the sensor electrode array are preferably comprised of materials which are CE marked and suitable for use in medical devices, posing very low levels of risk to patient safety.

Embodiments of the present invention seek to overcome the limitations of conventional balance assessment by enabling data capture on the movement of the eyes over an extended period (such as up to 30 days or more). The monitoring device would preferably be made available at the point of initial referral to both improve the accuracy of diagnosis and avoid delay in diagnosis, the captured data providing details allowing retrospective identification and analysis of eye movements.

Embodiments of the present invention will capture a range of eye movement data, which might include a characteristic eye movement (nystagmus) produced as a normal reflex action, but also as a symptom during a 'dizzy attack'. Nystagmus is a clinical sign specific to the inner ear. However, a number of patterns of nystagmus are produced as a consequence of conditions that are not caused solely by a malfunction of the inner ear. In preferred embodiments of the present invention, captured eye movement data is correlated with other data to aid in diagnosis.

In one embodiment, the monitoring system includes an orientation monitor such as a multi-axis accelerometer, gyroscope or the like that that is worn by the subject. In one embodiment, a controller, power source and data store is housed in a separate wearable component to the sensor electrode array. For example, they may be housed in a logging unit that is held behind a subject's ear. The orientation monitor could be integrated into the logging unit. In one embodiment, the monitoring system includes a button or other actuator to receive subject input from the subject. When a dizziness episode is first experienced (and potentially when it is felt to have passed), the subject may be asked to press the button and data from the button is associated with the eye movement data and stored in the data store. The button could also be integrated into the logging unit.

It will be appreciated that the logging unit could include or interface with other devices or sensors such as blood pressure monitors, heart rate monitors and the like and retrieve data (continuously or during periods identified as potentially relating to an episode) to further augment the data recorded.

BRIEF DESCRIPTION OF THE DRAWINGS

An embodiment of the present invention will now be described, by way of example only, with reference to the accompanying drawings in which.

DETAILED DESCRIPTION

Figure 1:
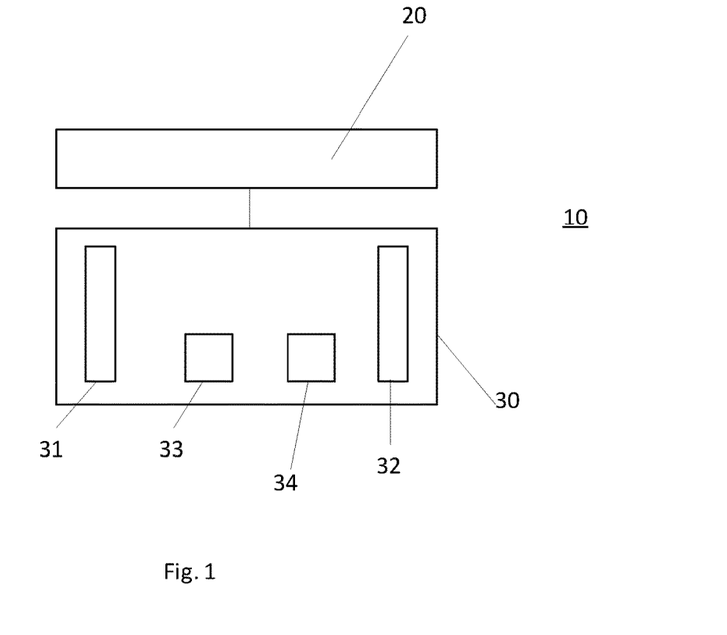
FIG. 1 is a schematic diagram of a portable wearable eye movement monitoring system according to an embodiment of the present invention.

FIG. 1 is a schematic diagram of a portable wearable eye movement monitoring system according to an embodiment of the present invention.

The wearable eye movement monitoring system 10 includes a sensor electrode array 20, a logging unit 30 and a battery power source 32.

The sensor electrode array 20 is configured to obtain data on eye movements, by obtaining data on the corneo-retinal potential of the subject. The logging unit 30 is configured to communicate with the sensor electrode array 20 to receive the obtained data and record the data in a data store 31. The battery power source 32 is configured to power the wearable monitoring system 10 for a plurality of days whereby data on eye movements of the subject is captured substantially continuously for said plurality of days.

Preferably, the logging unit 30 includes a 3-axis accelerometer 33 which provides information regarding head movement in terms of yaw, pitch and roll. The data store 31 records the CRP and accelerometer data for later analysis, which could be automated or by a clinician. Analysis is typically by download of the data at the end of the monitoring period, either via a wired data connection to the logging unit 30 or wirelessly (such as via Bluetooth). Optionally, the wearable eye movement monitoring system 30 may continuously or periodically upload data to a remote server instead of or in addition to download at the end of monitoring. In one embodiment, the logging unit 30 may upload data if an event is identified or indicated by the subject.

Data analysis is preferably performed offline by a remote system, although the logging unit 30 may optionally perform analysis or pre-screening. Particularly if substantial amounts of data are being produced, the logging unit 30 may filter data corresponding to normal periods and only retain data associated with events, possible events or abnormal data.

The logging unit 30 is preferably configured to record non-vital physiological signals (eye and head movement), for substantially continuous periods. The exact period worn may vary depending on the user, lifestyle and also monitoring needs. In general, the system 10 is intended to be worn in non-clinical settings and to provide an almost continuous record of eye movement during the period monitored.

Preferably, the system 10 includes two non-sterile components: a sensor electrode array 20 that adheres to the subject's face, and a small reusable electronic module (the logging unit 30) which records the data from the electrodes. In one embodiment, the sensor electrode array is disposable and replaced each time it is removed for washing etc. In another embodiment, the sensor electrode array includes a reusable array body and disposable components for adhering the sensor electrode array to the user's face.

The sensor electrode array 20 is intended to be worn for the majority of the day (including while the user is sleeping). On a daily (or other desired frequency), the user removes the logging unit 30 and sensor electrode array 20 to shower or wash before applying a new sensor electrode array to their face and re-connecting the logging unit 30, as described in the instructions provided to them. Generally, they will repeat this process daily.

As indicated above, the monitoring period may vary depending on factors such as those identified above but would typically be up to 30 days. Longer periods are possible, although data capacity and battery life of the logging unit 30 would need to be considered, either by extending them or by providing means to download data and recharge/replace batteries (and preferably alerting the user or an operator when this is needed).

Implementations can be envisaged where the sensor electrode array 20 is water resistant and allows the user to bathe, shower etc while still wearing it. In such a situation the logging unit may also be water resistant and worn or else it may be connected to the array by Bluetooth or similar and can be left out of the way of splashing/immersion but still receive data (in such an arrangement, the sensor electrode array would need its own battery and Bluetooth transmitter).

At the end of the monitoring period, each participant will return the logging unit 30 to the hospital or medical practitioner along with the non-disposable accessories and any remaining disposable accessories.

The primary function of the system 10 is to record eye movement data, including events such as nystagmus. The system 10 records both horizontal and vertical eye movement data, in which the characteristic nystagmus waveform will appear if the subject experiences nystagmus.

As discussed above, the sensor electrode array 20 and logging unit 30 will generally be worn almost continuously for the monitoring period (e.g. up to 30 days). Preferably, the system 10 also records any accelerative forces experienced by the subject's head via a 3-axis accelerometer which preferably is within the logging unit 30.

A user event marker button 34 is also preferably provided to allow the subject to indicate and have the logging unit 30 mark the time of periods of particular interest which they feel may be relevant to the recorded data.

Preferably, pressing the button 34 causes the logging unit 30 to log the date and time that the event marker button is pressed.

Preferably, the logging unit is configured to detect a "lead off" event when the electrodes are not connected to the face. This event is recorded in the data files in the logging unit so that periods when the device was not worn (e.g. for washing) can be later identified during processing.

At the end of the monitoring period, the user returns the system 10 to the clinic where the data will be downloaded from the logging unit 30 and then a computer system and/or operator will interpret the signal. For downloading, the logging unit 30 will preferably be connected to a computer by USB and will appear as a mass storage device on the computer. Files can then be removed the device as would be normal for any USB storage device. During this file transfer procedure, the device will preferably be powered by USB rather than the internal battery.

The logging unit 30 will preferably commence logging once the sensor electrode array has been connected to the logging unit and the user activates the device. The logging unit 30 may include a status LED that is illuminated to indicate correct operation. Data captured from the device is preferably stored in a text format, with each day stored in a separate, date-identifiable file. The subject's involvement with the system 10 preferably consists of its application and removal, and wearing the sensor electrode array 20 and logging unit 30 device during their normal daily activities. The system 10 preferably functions continuously while being worn, capturing time-stamped CRP and accelerometer data.

The status LED may reflect a status check result. In one example, the status check may be initiated by the user momentarily pressing the event marker button 34 (eg. for more than 3 seconds). Upon checking the device status, the LED could show, for example:

A permanent green light, meaning that the battery is OK and that the array 20 is providing signals indicative that it is attached properly to the face.

A flashing red light, meaning that the signals from the array 20 indicate that it is not properly attached to the face.

A flashing green light, meaning that the battery is getting low.

A solid red light, meaning that the battery needs replacing.

Figure 2A:
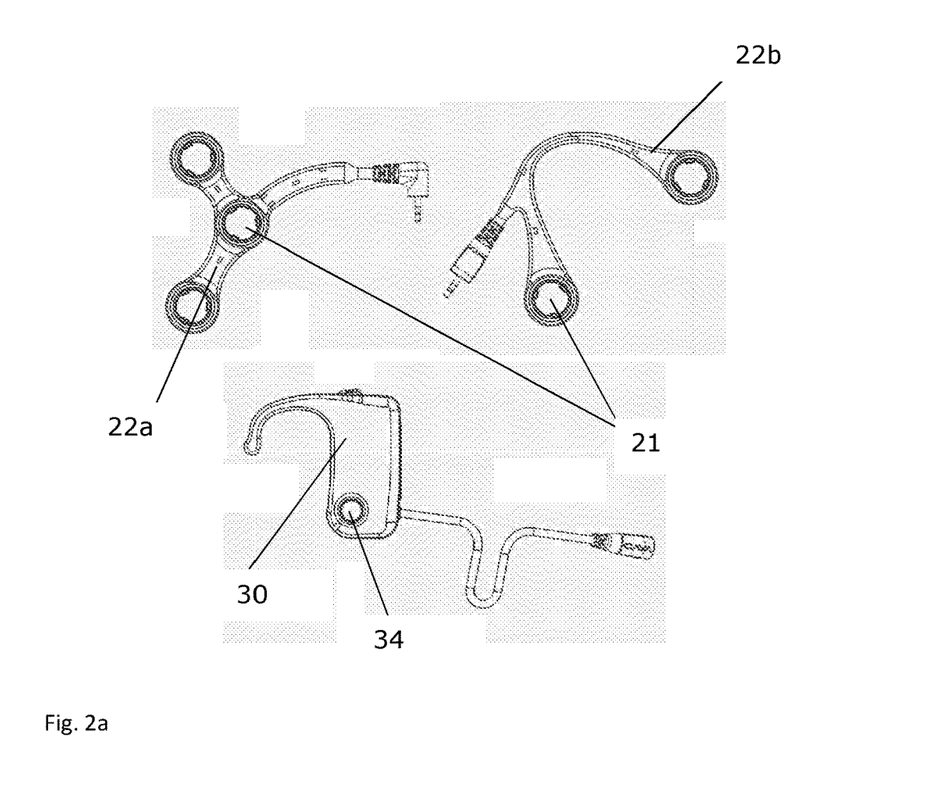
FIGS. 2a-b are views of a sensor electrode array according to an embodiment of the present invention.
Figure 2B:
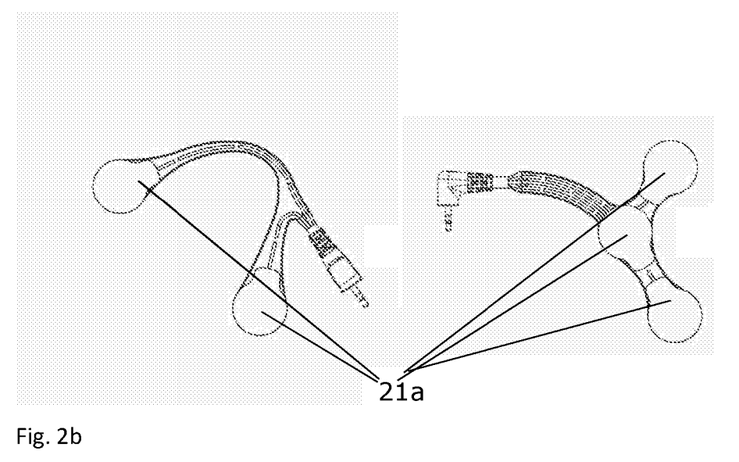

FIG. 2a is a perspective view of a sensor electrode array according to an embodiment of the present invention. FIG. 2b shows the reverse side with electrode contacts 21a that are worn against the user's skin when in use.

The sensor electrode array 20 preferably provides data on the Corneo-Retinal Potential (CRP) produced by the eyes as they move. Preferably, the sensor electrode array 20 includes a plurality of electrodes 21 mounted in a mount 22 for positioning the electrodes 21 at or about predetermined positions on a subject's head when the mount is worn, as illustrated in FIG. 3.

In a preferred embodiment, the sensor electrode array includes 5 adhesive electrodes 21 that are placed on the face when in use: Two electrodes monitor the horizontal movement of the eyes, two monitor the vertical movement, and a fifth electrode provides a reference voltage.

Figure 3:
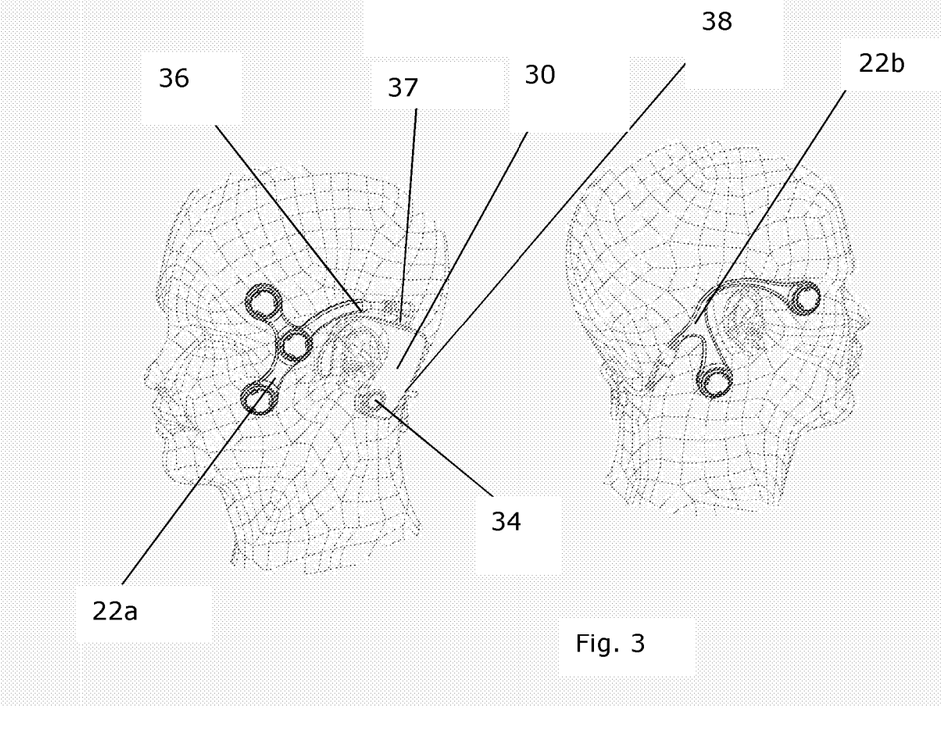
FIG. 3 is a perspective view illustrating the portable wearable eye movement monitoring system of FIG. 1 when worn; and, FIG. 4 is an Illustration of a nystagmus waveform in the horizontal channel.

Preferably, the electrodes 21 are mounted in a mount 22 for positioning the electrodes 21 at or about predetermined positions on a subject's head when the mount is worn, as illustrated in FIG. 3. In the illustrated embodiment, the 5 electrodes are split between two mounts 22a, 22b, one for each side of a user's head and which are then connected to the logging unit 30 to provide the data feed. However, it will be appreciated that different numbers of electrodes 21 may be used as well as different positioning. While it is generally preferred to use a mount formed from a flexible material to accommodate different shape and sized faces and still enable placement in substantially the same position, it will be appreciated that different sized sensor electrode arrays 20 could be produced. Although wired connections from the sensor electrode array 20 to the logging unit is preferred to reduce the number of components requiring their own power source, it will be appreciated that the sensor electrode array could be powered by its own power source and communicate wirelessly (such as via Bluetooth low energy) to the logging unit. Similarly, the sensor electrode array and logging unit could be integrated or components of one moved into the other.

As indicated above, the sensor electrode array 20 preferably includes two separate mounts 22a, 22b, containing between them five adhesive electrodes in total. In one embodiment, these are semi-flexible, silicone mounts that are disposable and are linked by a detachable connector to the logging unit 30 which rests behind the left ear when the system 10 is worn. As discussed above, the array 20 is preferably designed to be replaced by the subject on a periodic (e.g. daily) basis. Splitting the sensor electrode array 20 into two independent mounts allows simplified electronic connectors (in one embodiment, 3.5 mm audio jacks) to be used for attachment to the logging unit 30. These are easy to use and will be familiar to most wearers of the device, as they are commonly found on audio equipment, such as headphones. Arranging the mounts in this way also avoids them running across the front of the face, minimising the impact on a subject's physical appearance.

Each mount forms a mount for its respective electrodes 21. The electrodes 21 are attached to pre-defined locations, such that they can be applied to specific points on the face (FIG. 2A), and thus conduct the voltage potential produced by the eyes as they move. One mount wraps around the back of the head, extending to the right-hand side of the face, while the other is attached to the left-hand side of the face.

Both mounts preferably contain a single electrode (horizontal channel) positioned near the outer canthi of the eyes. This positioning captures the CRP corresponding to horizontal eye movement. On the left-hand mount, a further two electrodes (vertical channel) are placed above and below the left eye, approximately in line with the outer corner of the eye, to capture vertical eye movement. A final electrode is placed on the skin under the right ear, providing a reference voltage from which the other signals are preferably offset. A preferred embodiment of the sensor electrode array is illustrated in FIG. 2b. During a 30-day trial, each subject will be supplied with enough single use arrays to replace them daily and to allow for spoilt arrays.

The sensor electrode array electrodes make direct contact with the skin during normal use, and as such the components contacting the skin are preferably formed from materials selected for their suitability for long-term skin contact.

Three key design considerations guided the development of the sensor electrode array. Firstly, they were designed to make a stable connection with the skin on the face. The mounts are preferably semi-flexible, so they do not move unnecessarily nor restrict the wearer's movements. This feature limits the generation of signal artefacts resulting from instability in the electrode-skin junction. Another benefit of being semi-flexible is that the mounts provide a template for fixing the electrodes to the face, reducing the burden on the user to apply the electrodes to the correct positions. Secondly, wet (hydrogel) contact electrodes are preferably used in order to ensure low impedance between the electrodes and skin. Low impedance is key to reliable signal extraction. Finally, electrodes that are biocompatible to skin for the required duration of wear were selected. This is in order to maximise user tolerance of wearing the device and to reduce the possibility of skin irritation.

FIG. 3 is a perspective view illustrating the portable wearable eye movement monitoring system of FIG. 1 when worn. The logging unit 30 in this embodiment includes a main body 35 housing the components discussed above with reference to FIG. 1, the event marker button 34, an ear clip 36, a left electrode connector jack 37 and a right electrode connector jack 38.

Once the logging unit is worn about the ear using the ear clip 36, the electrodes are connected via their respective connector jacks 37, 38.

The logging unit 30 receives, digitises and records the voltage potentials from the electrodes 21 of the sensor electrode array 20. The signal from the electrodes 21 is sampled by the logging unit 30, preferably at a frequency of 63 Hz (although other frequencies could be used such as 100 Hz) and at 12-bit precision. The sampling frequency is preferably at least twice the maximum frequency to be extracted from the data. In present embodiments, the frequencies of interest are below 10 Hz but in other embodiments higher frequencies may be of interest. Higher sampling frequencies will also reduce battery life and increase data storage requirements. The likely sampling range would be between around 5 Hz and 1 kHz.

As discussed above, the logging unit also preferably includes a 3-axis accelerometer 33, which simultaneously provides data on the accelerative forces experienced by the head which are recorded by the logging unit 30. The event marker button 34 is present on the body of the logging unit to allow the subject to log events of interest (such as experiencing a dizzy event). Upon the button being pressed, the logging unit 30 records the date and time of the button press. The logging unit 30 also preferably includes an indicator LED, which is used to indicate both normal device operation or device malfunction. Data captured by the device is preferably stored on an inbuilt SD card. This data is intended to be downloaded and viewed by an expert. Data can be downloaded by a clinician preferably by way of a USB-B interface (not shown). Preferably, neither the SD card nor the USB-B interface are accessible to the subject, minimising the chance of damage to the device or loss of data.

In the illustrated embodiment, the logging unit is worn behind the subject's ear, although it will be appreciated that with changes to the body of the logging unit, other wearing positions are possible. The logging unit 30 rests on top of the left ear. The electrical connectors from the two flexible mounts attach to defined locations on the logging unit. The event marker button 34 is present on the bottom of the device.

The sensor electrode array 20 and logging unit 30 have been designed to be comfortable to wear for extended periods of time and during normal daily activities. They are small, lightweight and minimally intrusive to the user. The logging unit is designed to not require maintenance between hospital visits (for example, the system is designed to operate over an entire monitoring period without needing a battery change). This minimises the periods of device inactivity and reduces the possibility of inactivity due to user error during device maintenance.

The physical appearance of the sensor electrode array and logging unit have been designed to minimise the impact on the wearer during normal daily activities, and to reduce the visual impact and social implications of wearing the device. Specifically, preferred embodiments of the sensor electrode array have been designed to wrap around the side of the face from the back of the head, instead of across the front of the face, minimising the appearance of the device during face-to-face communication. Various design options were considered for the positioning of the logging unit, and a position similar to that of a hearing aid was found to be comfortable and to minimally restrict the wearer's movement, both during daily activities and in a variety of sleeping positions. However, it will be appreciated that other positions are possible.

The electronics underlying the logging unit preferably include a Microcontroller Unit (MCU) and an analogue to digital Front End (FE). The MCU is a lower power, 8-bit chip chosen to offer an integrated USB solution for the system 10. As its primary function is to record data from other peripherals via serial communications, minimal peripheral support is needed beyond battery monitoring and general purpose input and output. The MCU also supports a timing function. The FE is based on an integrated 2-channel device To ensure that the system 10 could operate between hospital visits without the need for battery charging or replacement, power budget calculations were performed. The power budget calculations revealed that only an AAA battery would be sufficient for the typical monitoring period (of 30 days).

Memory requirement calculations were also performed to ensure that the logging unit's data store 31 had sufficient storage to accommodate 30-days of device data, captured at the required sampling frequencies and precision. The most significant volumes of near-continuous data come from the 5 sensor electrodes (which produce 2 data channels) and from the 3-axis accelerometer. In addition, the logging unit 30 also captures date-stamped event marker logs in response to event marker button presses. The memory usage calculations revealed that a storage capacity of greater than 1 GB would be required by the system 10. For this reason, 2 GB uSD cards are used, providing a good level of storage redundancy.

Preferred embodiments of the system 10 offer continuous monitoring of two views of a user's electro-oculogram (EOG) at a frequency of 63 Hz/12-bit resolution. In preferred embodiments, the system 10 also simultaneously records accelerative forces of the head in 3 axes and uses these to deduce a measure of activity for the purpose of assessing the effects of motion on the recorded signals. Preferably, as well as logging the raw accelerometer data, the logging unit 30, via the accelerometer 33, detects and then logs certain classes of movement (e.g. prone to supine). Recorded data signals are extracted from the unit once the logging unit 30 has been removed from the user.

An analysis system is preferably used to automatically identify the periods of nystagmus that correspond to instances of dizziness experiences by the user from the extracted data. This system may be local to the hospital, cloud based or similar. Details of each nystagmus event are estimated by the analysis system and returned to the clinician, including beat direction, beat frequency, time of onset and duration.

The analysis system preferably pre-processes the extracted data to counteract signal drift. Next, specific recognition features are extracted from the data. These features are either the time-series signal itself (as in classifier 1), or derived from the velocity of the signal (classifier 2), or a frequency domain representation from a Fourier transform (classifier 3). The first two classifiers do not strictly require a computer model to be trained from a body of training data. Instead, they require estimates of the desired signal characteristics as input parameters (For classifier 1, this includes: nystagmus magnitude, frequency, duration, etc.). By contrast, classifier 3 requires the training of a computer model from data other than that to be used for testing.

Feature generation is preferably performed using a sliding window approach. Windows of samples, typically 2-12 seconds in duration but may be varied depending on implementation, are taken at equally spaced intervals across the input signal. The input signal could be the original waveform or features derived from that waveform. Windowing allows statistically robust estimates of signal characteristics to be made, and estimates of temporal parameters that could not made from individual samples.

The method used to identify nystagmus events depends on which classifier is used. Classifier 1 uses a dynamic programming technique called Distance Time Warping (DTW) to compare a template of nystagmus against a windowed representation of the original time-series signal. Generally speaking, the closest windows to the template are classified as nystagmus. Classifier 2 uses the velocity of the time-series signal to measure the proportion of samples within a window that are negative compared to positive. This newly derived signal is processed to find periods with consistent and significant sign and magnitude. These peaks in the velocity-derived signal correspond to nystagmus. Additionally, the sign of the signal is also used to assign the beat direction the nystagmus. Classifier 3 creates a computer model of both normal eye movements and nystagmus, using the frequency domain representation of these signals. A number of different techniques (Support Vector Machines, Neural Networks etc.) can be used for this purpose. For unseen data, the model uses the discriminative features identified during the training process to distinguish between normal and nystagmus signals, assigning class labels accordingly. It will be appreciated that multiple classifiers could be used in a weighted model to improve accuracy of classification.

The last step of using a peak detector discussed above can optionally be combined with or replaced by another validation step. For example, a period recognised as nystagmus may be compared to simulated templates of the same length, using DTW. The decision to accept or reject the nystagmus candidate is then based on a threshold distance value.

The classifiers preferably each provide a decision for each frame of data within a day on whether nystagmus is detected, and a corresponding measure of confidence for that decision.

For all systems, classification is preferably performed on a window-by-window basis, and so it is possible for individual windows to be misclassified, corresponding to short durations of data. Typically, dizzy attacks in Meniere's patients can last several hours. Therefore, a number of post-processing steps are preferably applied to the classifier output to adjust classifier decisions based on the evidence provided by surrounding data. Firstly, short periods of normal eye movement (of a few seconds) contained within periods of nystagmus are assumed to be nystagmus. Following this step, short periods of nystagmus are assumed to be normal eye movement. After this step, a binary vector lists the segments within the original signal that contain nystagmus. Lastly, a peak detector is used to estimate the beat frequency of events recognised as nystagmus in order to discard events that do not meet the expected number of beats for the given duration.

Data from the accelerometer 33 and user-button 34 may be used in various ways. For example, accelerometer data may be used to improve the data analysis by understanding the wearers posture and activity level. This may be helpful in eliminating motion artefact and noise (e.g.: if a patient is upright and active they are unlikely to be having a dizziness attack). Similarly, confidence weighting could be applied to processing such that if a button press occurs around the time of identified features, this adds to weighting decision that a dizzy attack has taken place. If only data from the array indicates a possible dizziness attack, then this may be weighted appropriately and flagged in the output as a minor or questionable attack.

The method preferably outputs several items: Firstly, if working on a batch basis (which may be the case even if from data from a single system as multiple files may be captured over the course of use), a list of the files tested is preferably output with an indication on whether or not they contain nystagmus. For each nystagmus event detected, the start time, duration, beat direction, frequency, SPV and the signal itself are preferably output/logged/displayed. The system also preferably produces an interactive display for each data file, highlighting the nystagmus in the file and allowing the clinician to zoom in on areas of interest.

Discussion of CRP Measurement

This CRP signal is a proxy for eye movement. Between the back and front of each eye there is a fixed dipole, which is positive at the cornea and negative at the retina. As the eyes move, as does the position of the positive potential at the front of each eye. By placing electrodes on the face, it is possible to record this voltage change through time. For example, horizontal eye movement may be captured by placing sensors at the outer edge of both eyes (outer canthi). When the eyes move to the left, the electrode at the left side receives a positive potential and the electrode at the right becomes negative. An operational amplifier is typically used to amplify the difference between these signals, producing a negative voltage when the eyes look left, or a positive voltage when the eyes look right. When both eyes are looking forward, the potential at both electrodes is approximately the same, and the amplifier produces a voltage close to 0.

Monitoring the CRP is one way in which the relationship between eye movement and the balance organs in the inner ear can be observed. This relationship is mediated by the vestibulo-ocular reflex (VOR), which stabilises images on the retina during head movements. This reflex is administered in a manner whereby the eyes move in the opposite direction to the direction of the head movement. The VOR does not require visual input and so is active both in total darkness and when the eyes are closed. As this is a brainstem reflex, it is also active when a subject is asleep or in a coma, and as such is used clinically to diagnose brainstem death. Because of this relationship, the movement of the eyes can reveal underlying clinical problems. For example, people with vestibular disorders may spontaneously experience a characteristic jerking eye movement known as nystagmus.

Nystagmus is characterised by a periodic motion in which the eyes involuntarily drift slowly in one direction, before moving in the opposite direction at a faster speed. Nystagmus can be horizontal or vertical; left, right, up or down-beating, as defined by the direction of the fast phase of the cycle (shown in FIG. 4). The slow phase velocity (SPV), measures the speed of eye movement in degrees per second during the slow component of nystagmus. Accurate measurement of the SPV depends on frequent recalibration of the ENG machine, as the CRP is known to vary due to a range of uncontrollable factors and even during the limited duration of a balance assessment clinic. However, SPV can be estimated from the recorded data and used clinically to quantify the speed of the nystagmus.

SPV could be calibrated during initial fitting of the system to the user. For example, while at the hospital users may be asked to perform simple eye movement exercises, the data from which can be used to calibrate the SPV. More complex calibration routines are also possible. For example, calibration may consider time of day, periods of sleep (detected from the accelerometer data), and light levels (the logging unit or array may, for example, include a light sensor).

Figure 4:
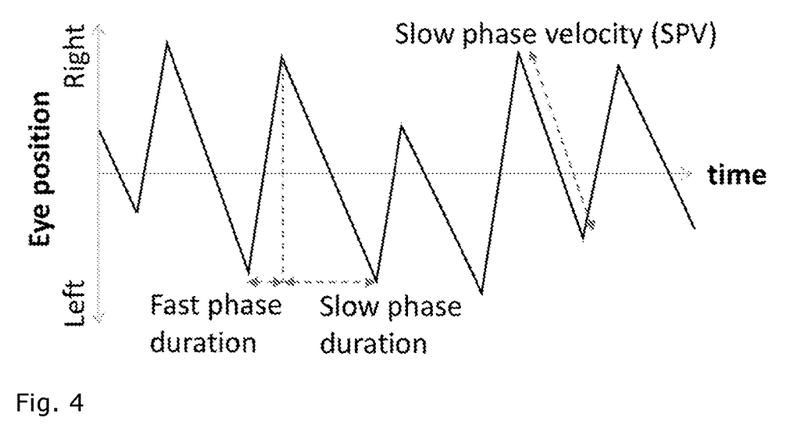

FIG. 4 is an Illustration of a nystagmus waveform in the horizontal channel. The horizontal axis represents time, and the vertical axis shows the position of the eyes, usually measured in degrees (assuming frequent re-calibration of the ENG system to ensure comparable signal magnitudes and to correct for signal drift). However, even without calibration, the amplitude of the signal can be used to infer the characteristics of eye movement. The example shown contains right-beating nystagmus, as the fast phase moves towards the right (upwards in the plot). The fast and slow phase durations, and slow phase velocity are indicated.

The precise pattern of spontaneous or induced nystagmus can be used to differentiate between a range of causes. For example, vertical pendular nystagmus is typically associated with disorders of the central nervous system. Horizontal nystagmus is more commonly linked to peripheral disorders, affecting the vestibular organs. Alternating patterns of nystagmus have been observed in patients suffering from Meniere's disease. Studies have shown that a preference to spontaneously beat in one direction, or a directional preponderance during caloric testing, can provide information about the underlying clinical cause; however, this topic is the subject of much debate. Aside from the inherent complexity of identifying the characteristics and causes of nystagmus, part of the difficulty in reaching a consensus of opinion comes from the limited duration of clinical assessments; a problem which embodiments of the present invention is well suited to overcome. Embodiments of the present invention do not require clinical tests and yet can reveal the presence and characteristics of spontaneous nystagmus, and possible correlations with head movement.

Experimental Results

Six subjects wore the system 10 continuously for two days.

Each day, subjects received a short review in which they commented on comfort, and ergonomic issues, and tasks were performed to assess device operation and data acquisition. The tasks included electrode measurements while the eyes were open, closed, and during optokinetic nystagmus, induced by an opto-drum smartphone app. Data was also acquired whilst subjects were walking around the room. The subjects performed six clearly defined periods of eye activity as shown in the table below.

| # | Activity | Time |
|---|---|---|
| 1 | Eyes shut | 60 s |
| 2 | Eyes open | 30 s |
| 3 | Follow right/left, up/down stimulus | 30 s |
| 4 | Eyes shut | 30 s |
| 5 | Follow nystagmus stimulus | 60 s |
| 6 | Fixed looking ahead position | 30 s |

Figure 5:
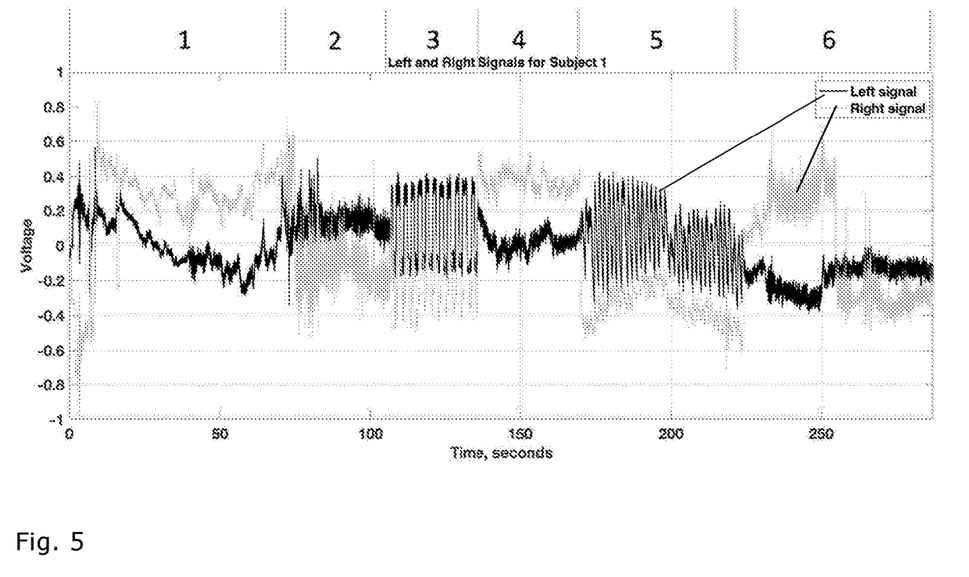
FIG. 5 is a graph showing typical outputs from the sensors close to the left and right eyes during a trial; and, FIGS. 6a, 6b, 6c and 6d are graphs showing the spectrum of the signals obtained using embodiments of the present invention during testing of users.

FIG. 5 shows the output from the sensors close to the left and right eyes during these six periods. During time-period five, the result of looking at an optokinetic stimulus is a periodic signal of large amplitude from one or both channels.

Figure 6A:
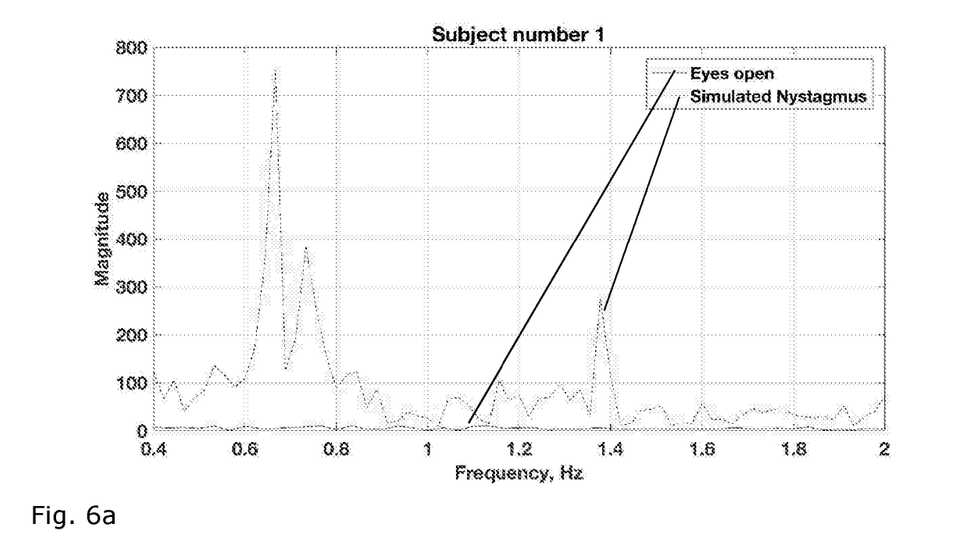
Figure 6B:
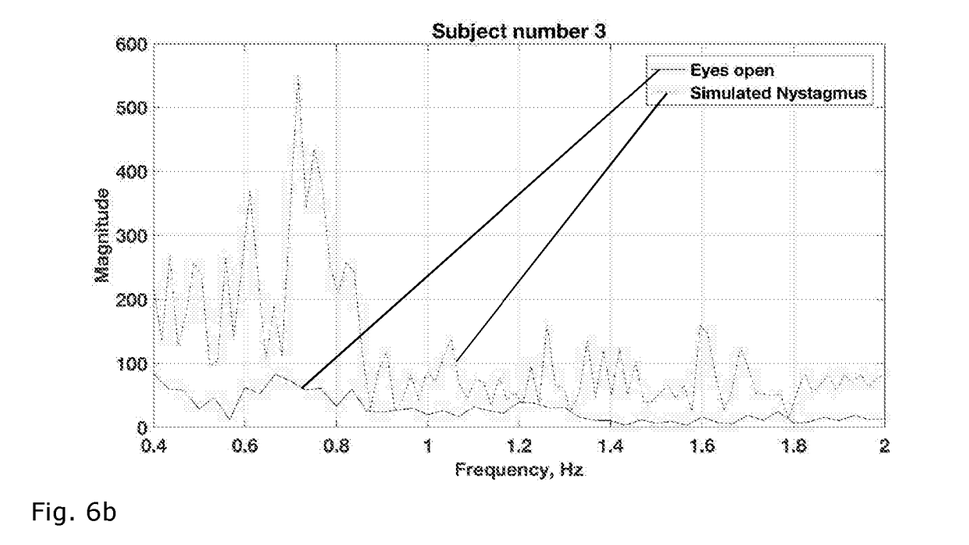
Figure 6C:
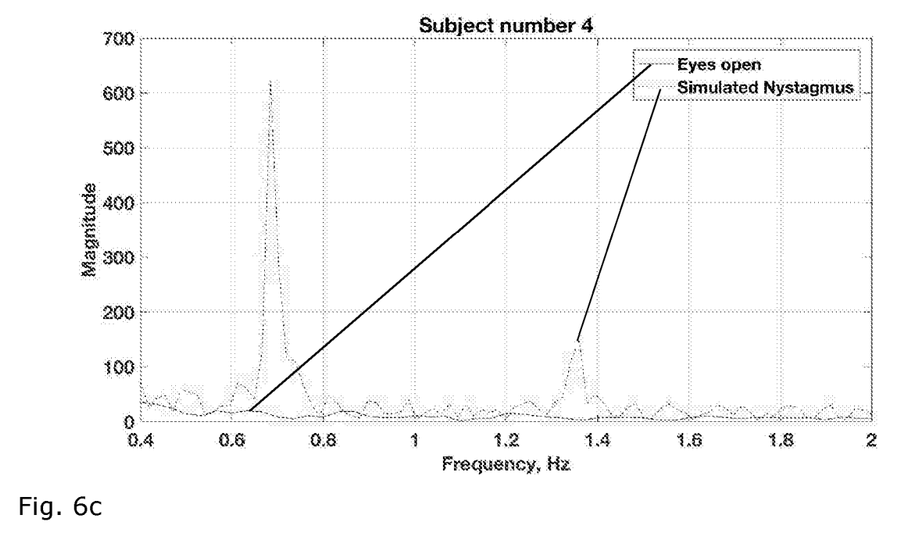

FIGS. 6a, 6b and 6c show the spectrum of the signals obtained from three of the subjects under "eyes open" and stimulated nystagmus" conditions. Note the peak that appears in the nystagmus condition at about 0.7 Hz in each case. The double peak for subjects one and three indicates that the subjects did not track the nystagmus condition as accurately as subject four. Peaks that appear at about 1.4 Hz are "first harmonics" of the periodic motion of fundamental frequency 0.7 Hz, as expected from Fourier theory. For subjects one and four, the spectra of the signals when the eyes are open is relatively flat because of the random nature of the signal, and it is also at a very low level because the movement of the eyes is very small. It appears that subject number three had a more restless movement of the eyes when they were open, and hence a greater amplitude. However, in all three subjects, the prominence of the peak in the nystagmus condition can be seen above the "noise" of the spectrum in the eyes open condition.

Figure 6D:
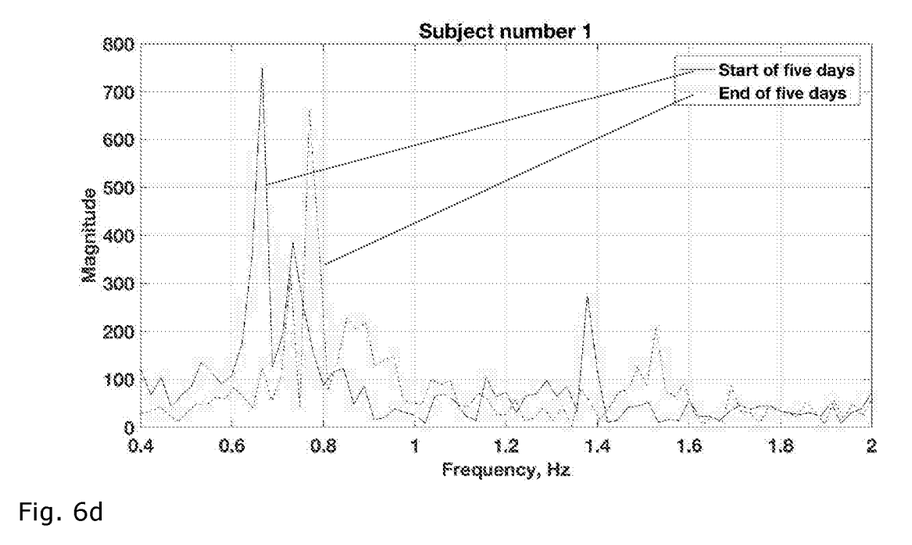

Using a single additional subject, a repeat of the consistency of the signal produced after five days was considered. FIG. 6d shows the spectra obtained from the nystagmus condition for subject no 1 at the start and end of the five-day trial. The displacement of the position of the peak in the two spectra is due to a change in the frequency of the opto-drum in the nystagmus-inducing app during the trial period. Results of the initial tests demonstrated consistent signal quality across all subjects enabling identification of occurrences of dizziness attacks across the monitoring period in post-processing. It was reported by test subjects that the sensor electrode array adhesion was maintained for at least 2-5 days indicating that daily changes may not be necessary (although may still be desirable to allow the user to wash). It was also reported that users were able to self-apply the sensors.

It is to be appreciated that certain embodiments of the invention as discussed above may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

While the analysis method set out above leverages particular features of the monitoring system and device such that analysis can be substantially automated and is computationally efficient yet accurate, it will be appreciated that the method could be used with other data sources (such as data from other monitoring systems/devices such as different array configurations). It will furthermore be appreciated that the monitoring device and system discussed above could also be used to provide data for other analysis methods.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

Various aesthetic features are included in the portable wearable eye movement monitoring system that are not discussed in this application.

The content of the priority application no GB 1808649.6 and of the abstract filed herewith are herein incorporated by reference.

The invention claimed is:

1. A portable wearable eye movement monitoring system comprising:
   a sensor electrode array configured to be attached substantially about each of a plurality of predetermined positions on a face of a user,
   a logging unit, and
   a battery power source,
   the sensor electrode array, when worn, is to be positioned laterally about the face of the user with respect to the eyes of the user, whereby the portable wearable eye movement monitoring system is substantially outside a field of vision of the user, the sensor electrode array being configured to obtain data on eye movements of the user,
   the logging unit being configured to communicate with the sensor electrode array to receive the obtained data and record the data in a data store,
   the battery power source being configured to power the wearable monitoring system for a plurality of days whereby data on eye movements of the subject is captured substantially continuously for said plurality of days,
   the sensor electrode array comprising a plurality of electrodes being divided between a first mount and a second mount, the first and second mounts being configured to position the electrodes at or about predetermined positions on the face of the user when worn,
   the first and second mounts being independently placeable on the face of the user and configured to position their respective electrodes on opposite sides of the face of the user when worn, and
   a connector configured to electrically connect the electrodes of the first mount to the logging unit, the connector being configured to pass around a rear of a head of the user when worn by the user.

2. The portable wearable eye movement monitoring system of claim 1, wherein the connector comprises an audio jack type plug and a socket connector.

3. The portable wearable eye movement monitoring system of claim 2, wherein the logging unit comprises an ear-piece.

4. The portable wearable eye movement monitoring system of claim 3, wherein the connector is part of the logging unit.

5. The portable wearable eye movement monitoring system of claim 4, wherein each of the first and second mounts connect to a connection port on the logging unit.

6. The portable wearable eye movement monitoring system of claim 1, wherein the logging unit includes an orientation sensor.

7. The portable wearable eye movement monitoring system of claim 1, further comprising an event marker button configured to cause the logging unit to tag the time and date that the event marker button is pressed in the data store.

8. The portable wearable eye movement monitoring system of claim 7, wherein the logging unit includes a status LED and responsive to a predetermined actuation of the event marker button, the logging unit is configured to illuminate the LED to indicate status of the system.

9. The portable wearable eye movement monitoring system of claim 8, wherein the status comprises one or more of a plurality of conditions selected from a set including:
   an OK status indicating the sensor electrode array is attached properly to the user's face, a lead off status indicating that the sensor electrode array is not properly attached to the user's face, a battery low status, and a replace battery status.

10. The portable wearable eye movement monitoring system of claim 1, wherein the sensor electrode array is configured to obtain data on a corneo-retinal potential of the subject.

11. The portable wearable eye movement monitoring system of claim 1, wherein a first one of the electrodes is configured for placement adjacent to a first outer canthi of a first one of the eyes of the user, and a second one of the electrodes is configured for placement adjacent to a second outer canthi of a second one of the eyes of the user.

12. The portable wearable eye movement monitoring system of claim 1, wherein each of the plurality of electrodes comprises a wet hydrogel contact electrode configured to make direct contact with the skin during use.

13. The portable wearable eye movement monitoring system of claim 1, wherein first and second ones of the electrodes are configured to monitor horizontal movement of the eyes, third and fourth ones of the electrodes are configured to monitor vertical movement of the eyes, and a fifth one of the electrodes is configured to provide a reference voltage.

14. The portable wearable eye movement monitoring system of claim 1, wherein the sensor electrode array includes a reusable array body and disposable components for adhering the sensor electrode array to the user's face.

15. The portable wearable eye movement monitoring system of claim 1, wherein the sensor electrode array includes the first and second mounts linked between each other and from one of the first and second mounts to the logging unit by respective connecting cables and connectors.

16. The portable wearable eye movement monitoring system of claim 1, wherein the logging unit is configured to detect a lead off event when the electrodes are not connected to the face and to record the event in the logging unit.

* * * * *